United States Patent
Allison et al.

(10) Patent No.: US 7,155,206 B2
(45) Date of Patent: Dec. 26, 2006

(54) METHODS, SYSTEMS, AND COMPUTER PROGRAM PRODUCTS FOR AUTOMATICALLY PROVISIONING INTELLIGENT NETWORK (IN) PLATFORMS, INCLUDING HOME LOCATION REGISTERS (HLRS), AND ROUTING NODES WITH PREPAID MOBILE SUBSCRIBER INFORMATION

(75) Inventors: Rick L. Allison, Cary, NC (US); Neil Tomlinson, Ascot (GB)

(73) Assignee: Tekelec, Morrisville, NC (US)

( * ) Notice: Subject to any disclaimer, the term of this patent is extended or adjusted under 35 U.S.C. 154(b) by 133 days.

(21) Appl. No.: 10/940,056

(22) Filed: Sep. 14, 2004

(65) Prior Publication Data

US 2006/0058028 A1 Mar. 16, 2006

(51) Int. Cl.
    *H04M 11/00* (2006.01)
(52) U.S. Cl. ............ 455/406; 455/408; 455/433; 455/456.1
(58) Field of Classification Search ....... 455/435.1, 455/405, 432.1, 433, 445
See application file for complete search history.

(56) References Cited

U.S. PATENT DOCUMENTS 6,535,746 B1    3/2003    Yu et al.

2005/0130624 A1*   6/2005   Batni et al. .......... 455/406
2005/0202816 A1*   9/2005   Warsta et al. ........ 455/433
2005/0250493 A1*  11/2005   Elkarat et al. ....... 455/432.1

FOREIGN PATENT DOCUMENTS

WO     2004/036769        4/2004
WO  WO 2004/028191 A1 *   4/2004

* cited by examiner

Primary Examiner—Temica Beamer
(74) Attorney, Agent, or Firm—Jenkins, Wilson, Taylor & Hunt, P.A.

(57) ABSTRACT

Methods, systems, and computer program products for automatically provisioning prepaid mobile subscriber information in a telecommunications network are provided. In one method, a location management message regarding a prepaid mobile subscriber is received at a routing node. The routing node determines whether a routing address translation entry exists for the prepaid mobile subscriber. If a routing address translation entry does not exist, the routing node sends a notification message to a provisioning system. The provisioning system receives the notification message and provisions an HLR with subscription information for the subscriber. The provisioning system also sends routing address translation information to the routing node for provisioning an entry in the routing address translation database for the subscriber. The routing node may then either route the original location management message to the HLR or discard the original message and wait until the MSC retransmits the location management message.

26 Claims, 7 Drawing Sheets

METHODS, SYSTEMS, AND COMPUTER PROGRAM PRODUCTS FOR AUTOMATICALLY PROVISIONING INTELLIGENT NETWORK (IN) PLATFORMS, INCLUDING HOME LOCATION REGISTERS (HLRS), AND ROUTING NODES WITH PREPAID MOBILE SUBSCRIBER INFORMATION

TECHNICAL FIELD

The present invention relates to methods and systems for processing signaling messages associated with prepaid mobile subscribers. More particularly, the present invention relates to methods, systems, and computer program products for automatically provisioning IN platforms, including HLRs, and routing nodes with prepaid mobile subscriber information.

BACKGROUND ART

In mobile telecommunications networks, some subscribers are prepaid subscribers while other subscribers are postpaid subscribers. A subscriber may be identified as prepaid or postpaid on the basis of the international mobile station identifier (IMSI), which is stored on the subscriber identity module (SIM) card inserted in the subscriber's handset. When the subscriber activates the subscriber's handset with the SIM card inserted, the subscriber is registered with a local VLR, and the VLR sends a message to the subscriber's HLR to obtain subscription information and to notify the HLR of the subscriber's current location. This message will be referred to herein as a location management message. The location management message includes the IMSI, which is used to access a record in the HLR. The record includes subscription information, including information regarding whether the subscription is prepaid or post-paid.

In order to facilitate the activation of prepaid services, mobile service providers have conventionally provisioned data for all prepaid SIMs in HLRs at the time the prepaid SIMs are issued, rather than when the prepaid SIMs are activated. In particular, an entry is created in the HLR for every issued SIM card. The entry may contain information about the subscription, such as the prepaid amount. Pre-provisioning the HLR with prepaid SIM card data decreases the time required to activate a new prepaid IMSI.

One problem with pre-provisioning the HLR with data for all prepaid SIM cards at the time of issuance is that HLR space may be unnecessarily wasted. For example, some of the prepaid SIM cards may never be activated. Other prepaid SIM cards may be activated months or even years after issuance. However, because the telecommunications service provider does not know when the SIM cards will be activated, the telecommunications service provider will typically provision all HLR entries in advance. Provisioning HLR entries in advance wastes HLR space and unnecessarily increases HLR database size. This leads to increased expense and possibly even increased lookup time for HLR database access.

Thus, in light of these problems with providing prepaid mobile telecommunications service, there exists a need for improved methods and systems for provisioning databases associated with providing prepaid mobile telecommunications service.

DISCLOSURE OF THE INVENTION

According to one aspect, the present invention includes a method for automatically provisioning a prepaid mobile subscriber information in a telecommunications network. The method includes receiving a location management message regarding a prepaid subscriber and determining whether an entry exists in a routing address translation database for the prepaid subscriber. If an entry does not exist and the subscriber is a subscriber of the telecommunications network service provider's network, a notification message is sent to a provisioning system. In response to the notification message, the provisioning system sends subscription information for the mobile subscriber to an HLR and to the routing address translation database. The subscription information may include any information associated with the subscriber's account, such as the prepaid credit amount, calling features, the IMSI, the MSISDN, etc. The routing address translation information may include a mapping from the IMSI and/or MSISDN to an HLR address.

Once the databases are updated, subsequent location management messages for the subscriber can be routed to the HLR and processed at the HLR using the provisioned subscription information. Because the HLR and the routing address translation database are not required to be provisioned in advance with prepaid subscription information, database resources are conserved.

In one implementation, the first location management message received from a mobile handset is discarded but used to trigger the sending of the notification message to the provisioning system. In this implementation, the mobile switching center (MSC)/visitor location register (VLR) that sent the location management message will time out after a predetermined time period and retransmit the location management message. If the routing address translation database and the HLR are updated before the second location management message is received, the second location management message will be routed to the correct HLR. If the routing address translation database and the HLR are not updated prior to the second location management message being received, another retransmission cycle may be required in order to ensure that the location management message is delivered. If all of the MSC/VLR's retransmission cycles have completed, the mobile telecommunications subscriber can trigger a new location management message by reactivating his or her handset.

In another exemplary implementation, the routing node that includes the routing address translation database does not discard the original location management message. Rather, the routing node stores state information regarding the original location management message. Once the provisioning system provisions the data for the prepaid subscriber in the HLR and in the routing address translation database, the routing node transmits the original location management message to the HLR. Thus, in this stateful implementation, only a single location management message is required to be sent by the MSC/VLR.

Exemplary implementations of the invention will be described in detail below as functions, modules, or processes. It is understood that these functions, modules, or processes can be implemented in hardware, software, firmware, or any combination thereof. For example, the functionality for automatically provisioning HLRs and routing nodes with prepaid subscriber information may be implemented as a computer program product comprising computer executable instructions embodied in a computer readable medium. The computer readable medium may be any medium capable of storing instructions executable by a processor for implementing the methods and systems described herein. Exemplary computer readable media suitable for use with embodiments of the present invention include optical and magnetic disk storage devices, memory chips, downloadable electrical signals or any other suitable memory storage medium.

Accordingly, it is an object of the invention to provide methods, systems, and computer program products for automatically provisioning HLRs and routing nodes with prepaid mobile subscriber information.

It is another object of the invention to reduce the need for provisioning HLRs with unactivated prepaid subscription information.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

Figure 1:
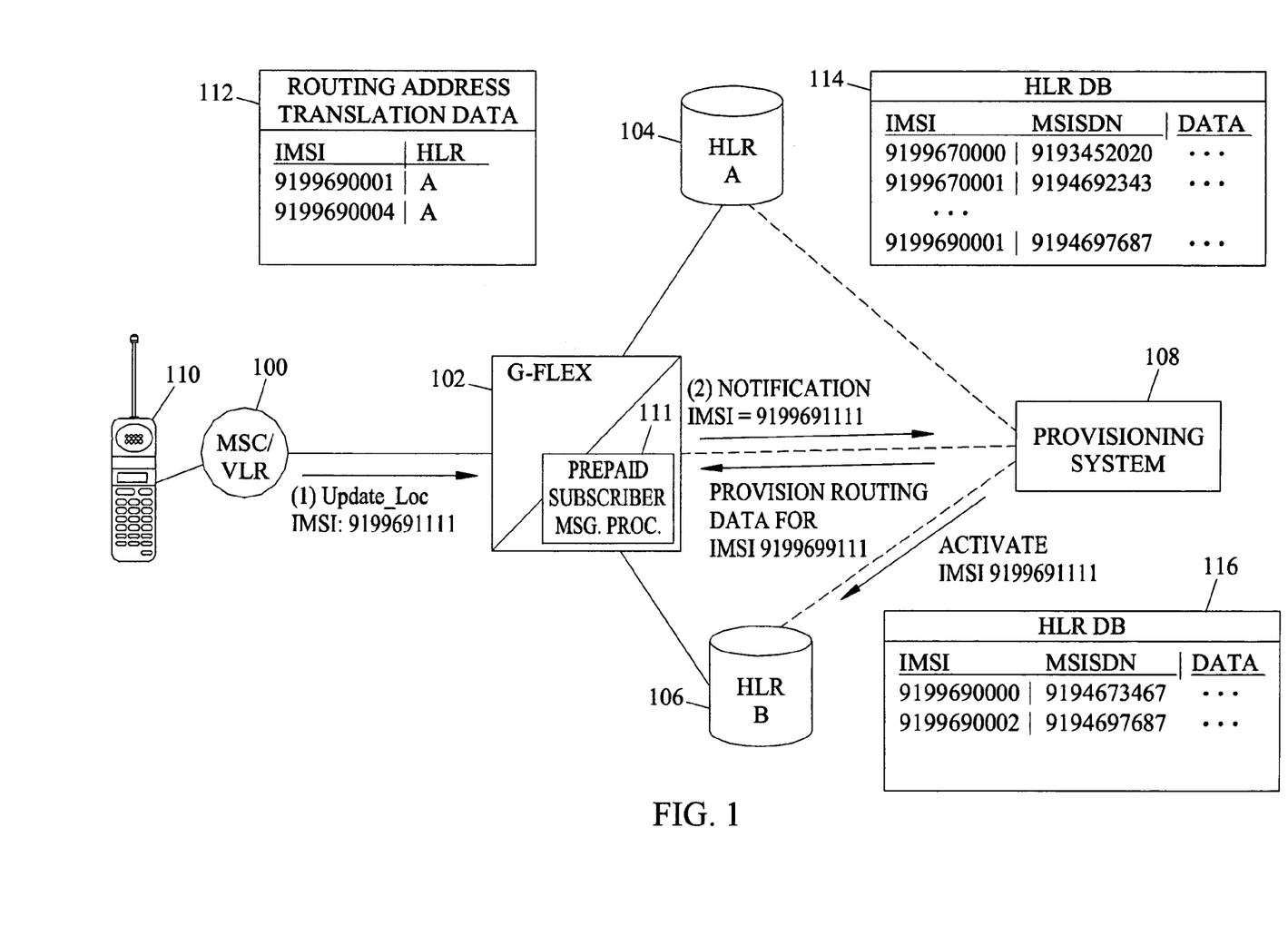
FIG. 1 is a network diagram illustrating an exemplary message flow associated with processing a location management message for a prepaid subscriber for which no translation or HLR data has been provisioned according to a stateless embodiment of the present invention.

The methods, systems, and computer program products for automatically provisioning HLRs and routing nodes with prepaid subscriber information may be implemented in any suitable mobile communications network that includes prepaid subscribers. Examples of such mobile communications networks include GSM networks and IS-41 networks. FIG. 1 is a network diagram illustrating an exemplary GSM message flow associated with processing a location management message associated with a prepaid subscriber according to a stateless embodiment of the present invention. Referring to FIG. 1, the network includes an MSC/VLR 100, a routing node 102, HLRs 104 and 106, and a provisioning system 108. MSC/VLR 100 may perform switching office and visitor location register functions for mobile subscribers, such as the mobile subscriber represented by telecommunications handset 110. Routing node 102 may route messages between nodes in the mobile communications network. In addition, routing node 102 may include a prepaid subscriber message processor 111 for processing messages associated with prepaid subscribers such that HLR databases and routing address translation databases can be automatically provisioned. HLRs 104 and 106 may store mobile subscription information. However, HLRs 104 and 106 are preferably not preprovisioned with information for unactivated prepaid mobile subscriptions. Provisioning system 108 may be a computing platform maintained by a telecommunications service provider for provisioning a routing address translation database in routing node 102 and for provisioning HLRs 104 and 106 with information regarding prepaid subscribers.

In the message flow illustrated in FIG. 1, when handset 110 is either activated or moves into the location area of MSC/VLR 100. Handset 110 registers with MSC/VLR 100. In response to the registration, MSC/VLR 100 sends a location management message to the subscriber's home HLR. In this example, because the network is assumed to be a GSM network, the location management message is an update location message. In an IS-41 network, the location management message would be a registration notification message. In the illustrated example, the update location message includes the IMSI that identifies the prepaid mobile subscription. When routing node 102 receives the update location message, routing node 102 determines that the update location message corresponds to prepaid subscriber who is a member of its network and that no translation data or IMSI is present in routing address translation database 112. Accordingly, routing node 102 sends a notification message to provisioning system 108 indicating that there is no translation data available for the IMSI 9199691111. Provisioning system 108 responds by sending an activate IMSI message to HLR 106 and a provision routing data message to routing node 102.

Figure 2:
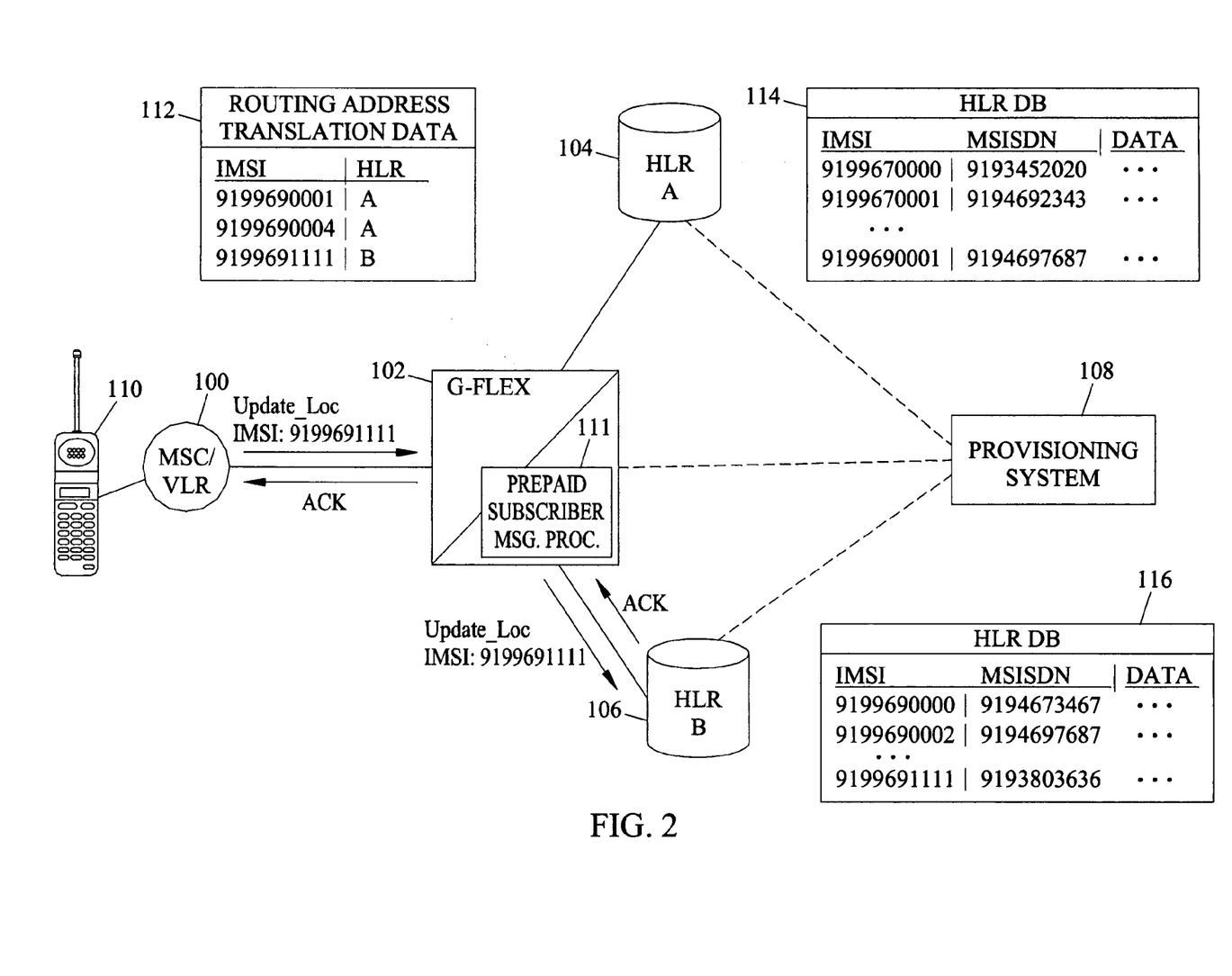
FIG. 2 is a network diagram illustrating the routing of a subsequent location management message after information has automatically been provisioned in an HLR and in an address translation database according to the stateless embodiment of the present invention.

Referring to FIG. 2, routing node 102 updates database 112 to associate the address of HLR 106 with the IMSI 9199691111. Similarly, HLR 106 creates an entry for the IMSI 9199691111. In the example in FIG. 2, since MSC/VLR 100 did not receive a response to the original update location message, MSC/VLR 100 retransmits the update location message. In this instance, because routing node 102 has routing address translation information for the IMSI, routing node 102 translates the IMSI 9199691111 to the network address of HLR 106 and routes the message to HLR 106. HLR 106 responds to the update location message with an acknowledgement message, which is routed back to MSC/VLR 100.

Figure 3A:
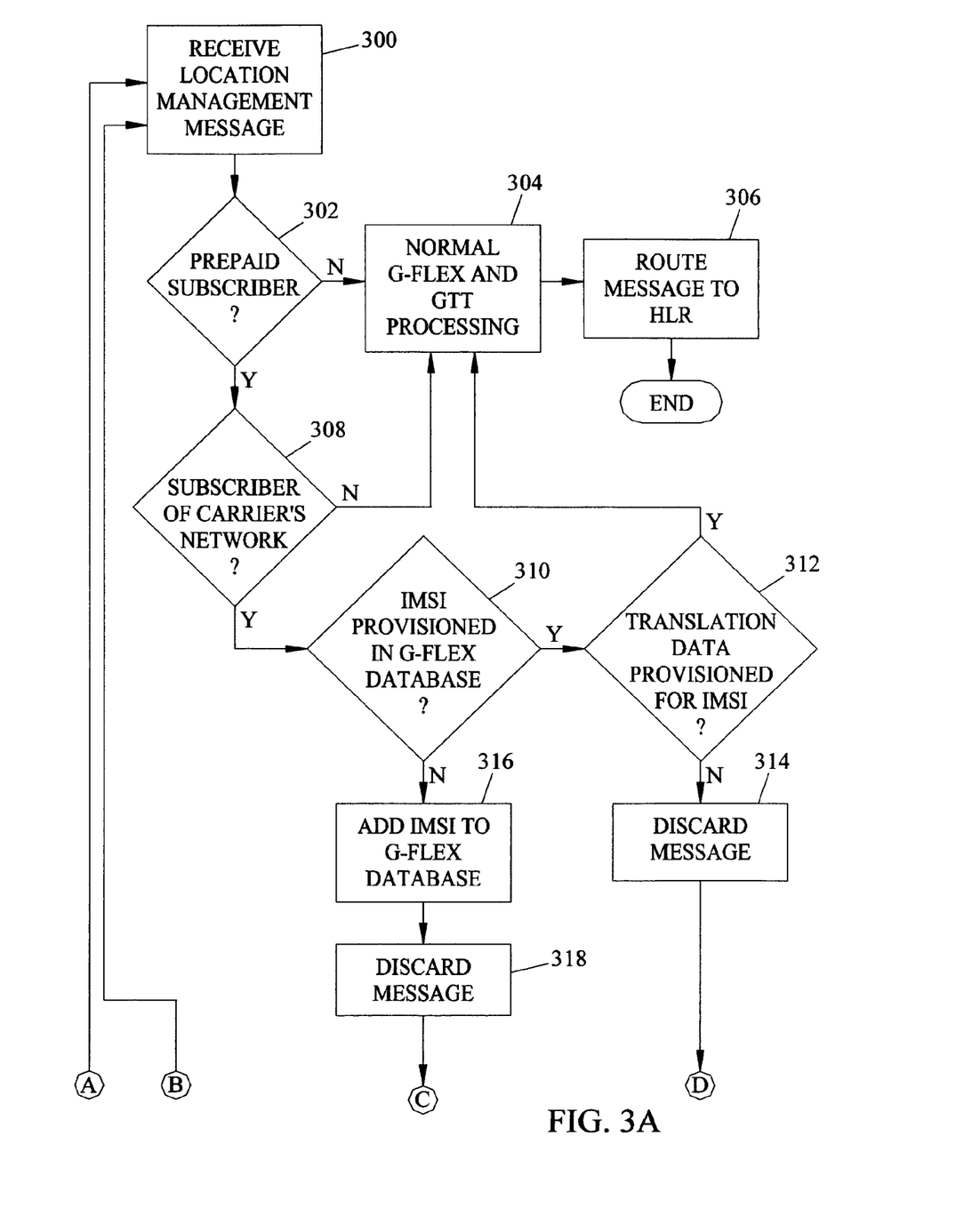
FIGS. 3A and 3B are a flow chart illustrating exemplary steps that may be performed in processing messages according to the stateless embodiment of the present invention.
Figure 3B:
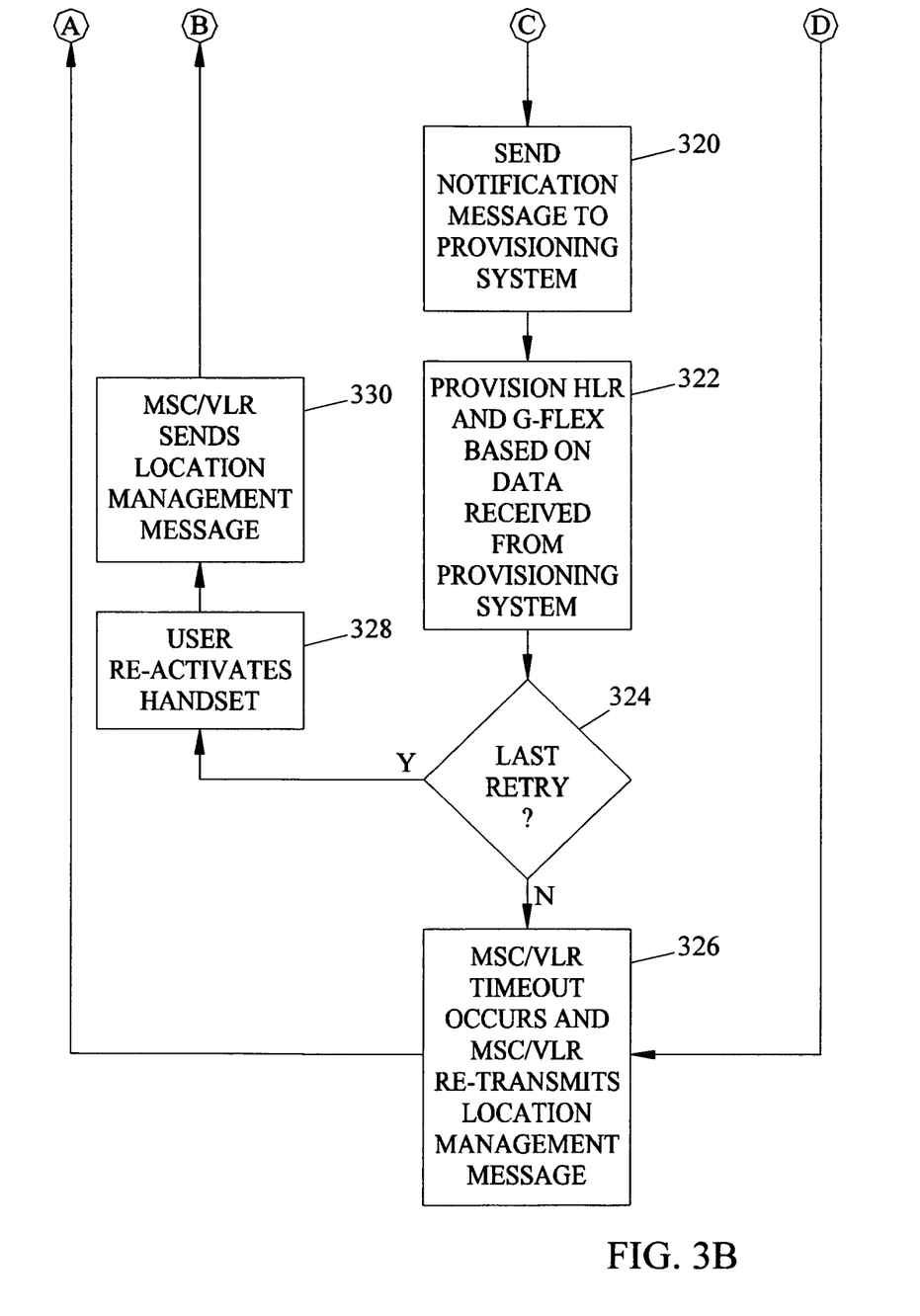

FIGS. 3A and 3B are a flow chart illustrating exemplary steps that may be performed by MSC/VLR 100, routing node 102, and provisioning system 108 in the stateless example illustrated in FIGS. 1 and 2. Referring to FIG. 3A, in step 300, routing node 102 receives a location management message. In step 302, routing node 102 determines whether the location management message is associated with a prepaid subscriber. If the message is not associated with a prepaid subscriber, control proceeds to step 304 where normal G-FLEX™ and global title translation (GTT) processing are performed. G-FLEX™ processing refers to translating the IMSI into a network address of an HLR using a database that maps individual IMSIs to HLR addresses. If the lookup in the G-FLEX™ database fails, processing falls through to global title translation processing where global title translation tables are examined to determine the final destination of the location management message. In step 306, the message is routed to the appropriate HLR.

Returning to step 302, if the subscriber associated with the message is determined to be a prepaid subscriber, control proceeds to step 308 where it is determined whether the subscriber is a subscriber of the particular carrier's network. If the subscriber is not a subscriber of the particular carrier's network, control returns to steps 304 and 306 where the message is translated and routed to the appropriate HLR. In step 308, if it is determined that the subscriber is a subscriber of the carrier's network, control proceeds to step 310 where it is determined whether the IMSI is provisioned in the G-FLEX™ database. If the IMSI is provisioned, control proceeds to step 312 where it is determined whether there is translation data provisioned in the database for the IMSI. If translation data is present, the IMSI has already been provisioned in the HLR. Accordingly, control proceeds to step 304 and 306 where the IMSI is translated and the message is routed to the HLR. If, however, the IMSI is present but no translation data is present, control proceeds to step 314 where the message is discarded. The G-FLEX™ database may be provisioned with an IMSI but no translation data if a location management message has been received but the translation data has not been received from the provisioning system. The reason for provisioning the IMSI in the database without translation data in response to the initial location management message is to prevent multiple notification messages from being sent to the provisioning system in response to multiple location management messages sent from the MSC/VLR.

Returning to step 310, if the IMSI is not provisioned in the database, control proceeds to step 316 where the IMSI is added to the G-FLEX™ database. In this implementation, it is assumed that the routing node does not store any state with regard to the first received location management message and relies on the retransmission cycle of the MSC/VLR to deliver the location management message to the HLR. Accordingly, in step 318, the location management message is discarded. Referring to FIG. 3B, in step 320, routing node 102 sends a notification message to provisioning system 108 requesting routing address translation information for the IMSI and requesting that the HLR be provisioned. In step 322, routing node 102 receives provisioning information from provisioning system 108 and stores the translation data in the G-FLEX™ database. Similarly, the HLR receives the prepaid subscription data and stores that data in its database.

In step 324, if the last retransmission of MSC/VLR 100 has not occurred, control proceeds to step 326 where MSC/VLR 100 times out and retransmits the location management message. Control then returns to step 300 where routing node 102 receives the new location management message and routes the new location management message to the correct HLR using the automatically provisioned translation data. In step 324, if the last retransmission of MSC/VLR 100 has occurred, control proceeds to step 328 where the user reactivates his or her handset. In step 330, MSC/VLR 100 sends a new location management message. Control then returns to step 300 where the new location management message is received and routed to the correct HLR using the newly provisioned translation data.

Thus, in the examples illustrated in FIGS. 1–3B, a routing address translation database and an HLR are automatically provisioned based on location management messages without requiring that the routing node store any state information. One advantage of this implementation is that the routing node is not required to keep track of location management message state. Allowing the routing node to be stateless reduces the processing load and memory requirements of the routing node. A disadvantage of this implementation is it requires the MSC/VLR 100 to retransmit the location management message.

Figure 4:
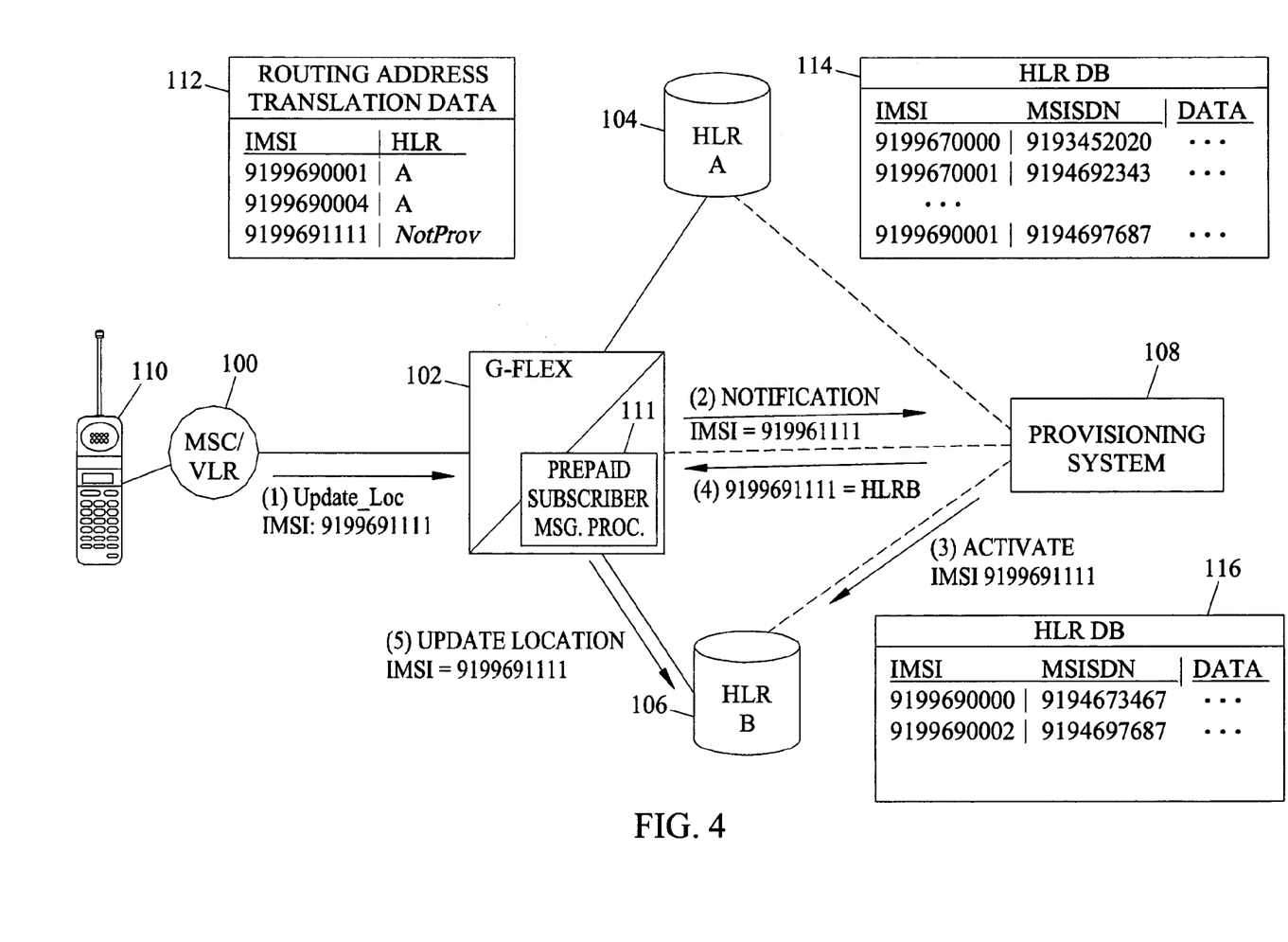
FIG. 4 is a network diagram illustrating an exemplary message flow for processing messages associated with prepaid mobile subscribers according to a stateful embodiment of the present invention.

FIG. 4 illustrates an example of a stateful implementation of the invention. In FIG. 4, routing node 102 stores state information regarding the original location management message and routes the original location management message once the routing address translation information is received from provisioning system 108. Referring to the message flow in FIG. 4, when routing node 102 receives the update location message, routing node 102 stores state information regarding the update location message and sends a notification message to provisioning system 108. Provisioning system 108 responds with the routing address translation data for the requested IMSI and sends information to HLR 106 to activate the IMSI. Once routing node 102 receives the routing address translation information, routing node 102 forwards the update location message to HLR 106 using the routing address translation information.

Figure 5:
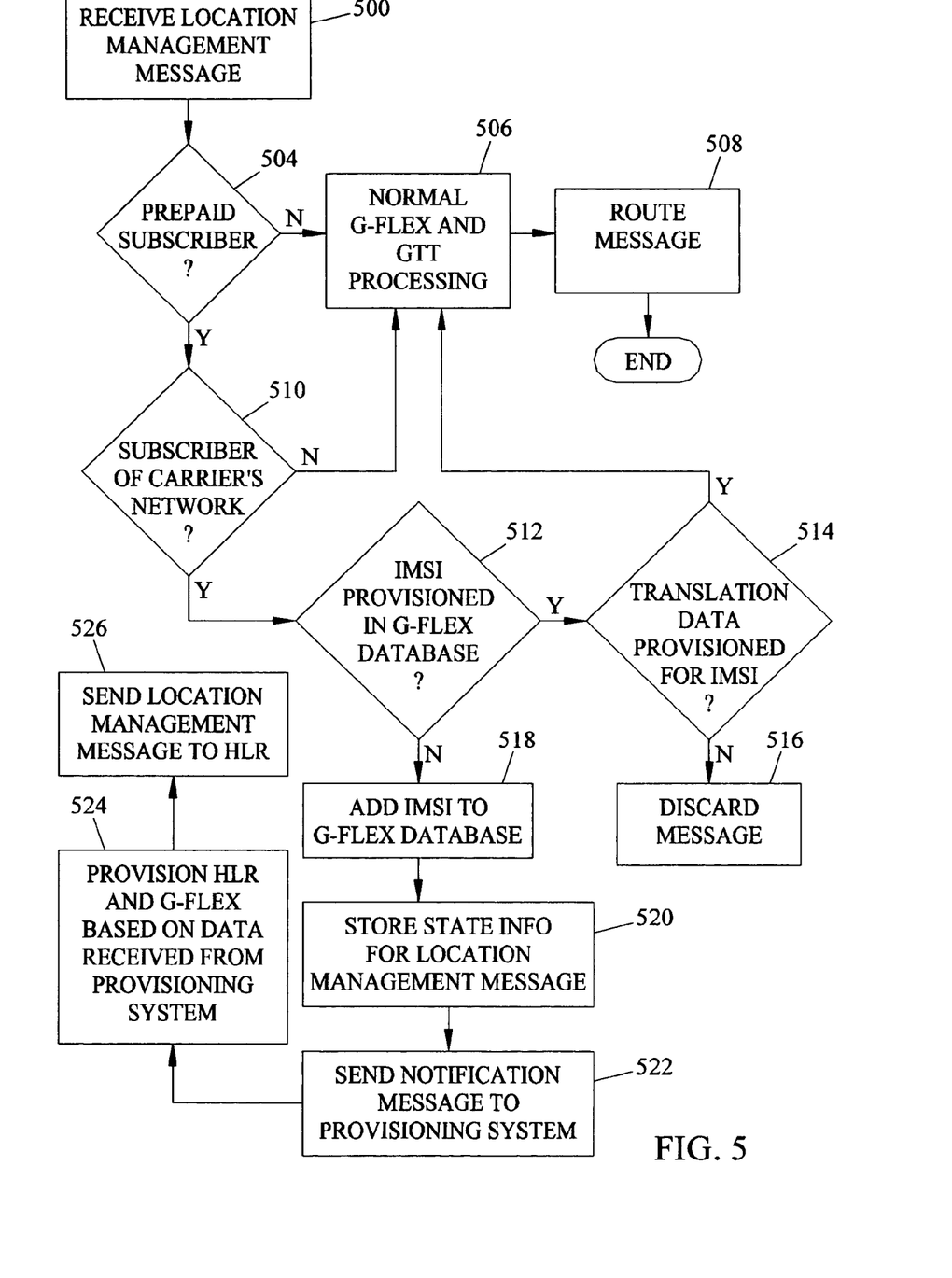
FIG. 5 is a flow chart illustrating exemplary steps that may be performed in processing a location management message for a prepaid subscriber according to the stateful embodiment of the invention.

FIG. 5 is a flow chart illustrating exemplary steps performed by routing node 102 and provisioning system 108 in the stateful example illustrated in FIG. 4. Referring to FIG. 5, in step 500, routing node 102 receives the location management message. In step 504, routing node 102 determines whether the location management message is associated with a prepaid subscriber. If the message is determined not to be associated with a prepaid subscriber, control proceeds to step 506 and 508 where the message is translated and processed as normal.

If in step 504, the location management message is determined to be associated with the prepaid subscriber, control proceeds to step 510 where it is determined whether the subscriber is associated with the carrier's network that owns the HLR associated with the IMSI. If the subscriber is not a subscriber of the carrier's network, there is no need to provision the IMSI in the carrier's HLRs. Accordingly, control proceeds to steps 506 and 508 where the location management message is translated and routed as normal In step 510, if the subscriber is determined to be of the particular carrier's network, control proceeds to step 512 where it is determined whether the IMSI is provisioned in the G-FLEX™ database. If the IMSI is provisioned in the G-FLEX™ database, control proceeds to step 514 where it is determined whether translation data has been provisioned for the IMSI. If translation data has been provisioned for the IMSI, the HLR has already been provisioned. Accordingly, control proceeds to step 506 and 508 where the message is translated and routed as normal. If translation data has not been provisioned for the IMSI, control proceeds to step 516 where the message is discarded. As stated above, if an entry in database 112 contains an IMSI but no translation data, this is an indication that the location management message is a retransmitted location management message. Since it is undesirable to have provisioning system 108 try to provision the same IMSI twice, any subsequent messages that arrive while the initial message is pending should be discarded.

Returning to step 512, if the IMSI is not provisioned in the G-FLEX™ database, control proceeds to step 518 where the IMSI is added to the G-FLEX™ database. In step 520, rather than discarding the location management message as in the stateless implementation, the state information for the location management message is stored. In step 522, routing node 102 sends a notification message to the provisioning system. In step 524, routing node 102 and HLR 106 receive their respective provisioning information and provision their databases. In step 526, routing node 102 sends the pending location management message to the HLR.

Thus, using the implementation illustrated in FIGS. 4 and 5, it is not necessary for MSC/VLR 100 to retransmit the location management message. If the location management message is re-transmitted, it will simply be discarded. Because routing node 102 stores state information for the original location management message, the original message can be routed to its destination once the routing address translation information is received. In addition, because the HLR is not required to be provisioned in advance with prepaid subscription information, HLR database resources are conserved.

Figure 6:
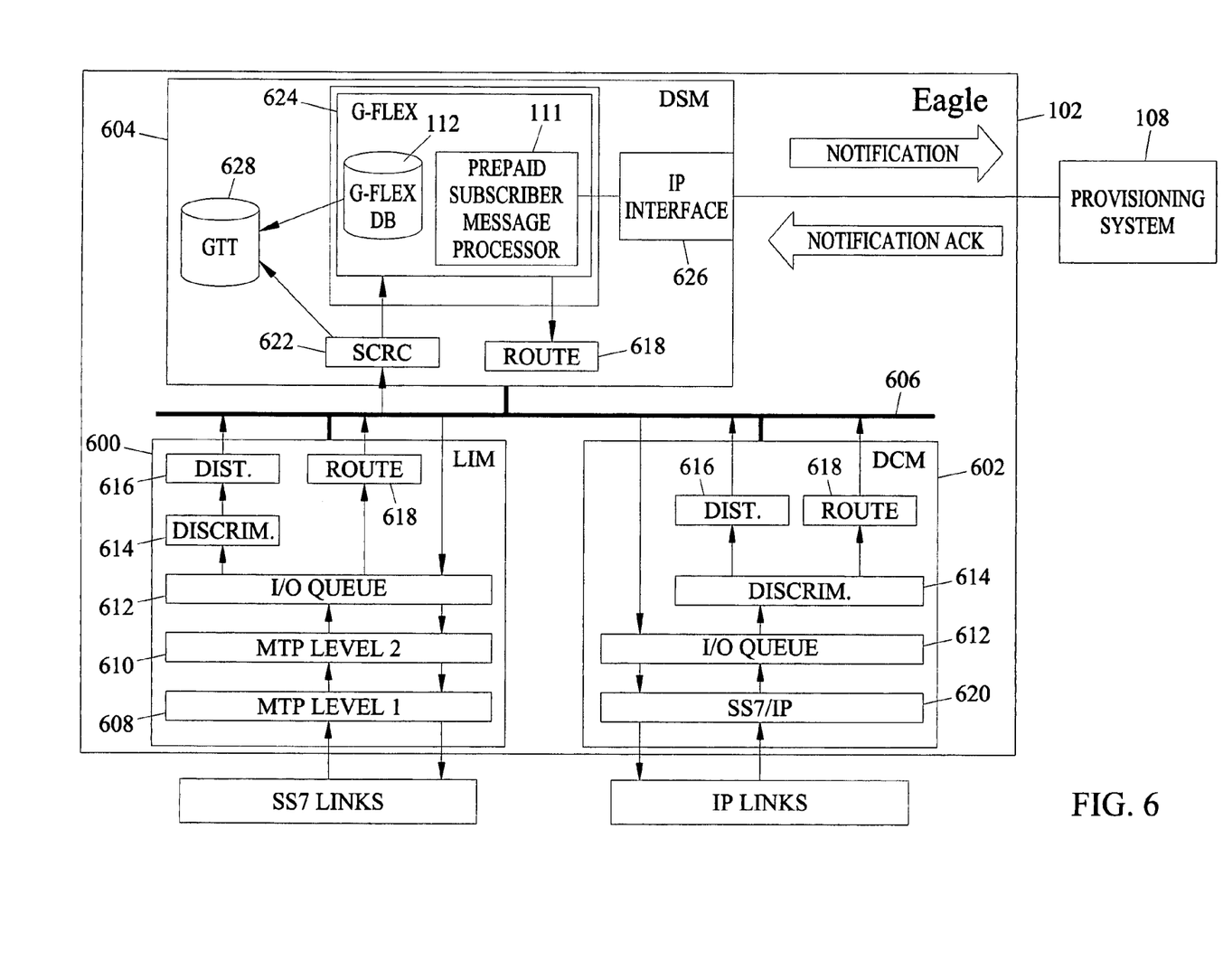
FIG. 6 is a block diagram illustrating exemplary internal subsystems of a network routing node suitable for implementing embodiments of the present invention.

FIG. 6 is a block diagram illustrating an exemplary hardware platform for routing node 102 including a prepaid subscriber message processor according to an embodiment of the present invention. The hardware platform illustrated in FIG. 6 may be implemented using the Eagle® STP equipped with a G-FLEX™ database available from Tekelec of Calabasas, Calif. In FIG. 6, platform 102 includes a link interface module 600, a data communications module 602, and a database services module 604. Modules 600, 602, and 604 may each be implemented using a printed circuit board including an application processor and a communications processor mounted thereon. The application processor may perform application functions, such as message routing, address translation, and prepaid subscriber message processing. The communications processor mounted on each circuit board may control communications over counter-rotating, dual-ring bus 606.

In the illustrated example, link interface module 600 includes functionality for sending and receiving messages over SS7 signaling links. This functionality may include an MTP level 1 function 608, MTP level 2 function 610, an I/O queue 612, a discrimination function 614, a distribution function 616, and a routing function 618. MTP level 1 and 2 functions 608 and 610 may perform the operations necessary to send and receive messages over an underlying physical medium. Examples of these operations includes error detection, error correction, message sequencing, and retransmission. I/O queue 612 stores MTP messages being transmitted to or from routing node 102. Discrimination function 614 examines the destination point code in a received location management message to determine whether the message is addressed to routing node 102 or to an external node. If the message is addressed to routing node 102, discrimination function 614 forwards the message to distribution function 616, which forwards the message to the appropriate internal subsystem. If the message is not addressed to routing node 102, discrimination function 614 may forward the message to routing function 618, which routes the message to the communications module associated with the outbound signaling link.

In one exemplary implementation, the location management message may be sent to the point code of routing node 102 and may be indicated as route on global title. For such a message, discrimination function 614 may forward the message to distribution function 616. Distribution function 616 may forward the message to database services module 604. The operation of database service module 604 in processing the location management message will be described below.

In an alternate implementation, routing node 102 may intercept location management messages that are not addressed to routing node 102. In such an implementation, discrimination function 614 may be modified to intercept location management messages that are not address to routing node 102 and may forward the location management messages to database services module 604. For example, discrimination function 614 may intercept location management messages that are sent route on point code subsystem number to a point code other than that of routing node 102 and forward these messages to database services module 604 for prepaid subscriber message processing.

Data communications module 602 includes functionality for sending and receiving signaling messages over IP signaling links. In the illustrated example, data communications module 602 includes functions 612–618, as described above with regard to LIM 600. Hence, a description thereof will not be repeated herein. In addition, DCM 602 includes an SS7/IP converter 620 for encapsulating SS7 messages in IP packets for transmission over an IP network and for removing SS7 messages from IP packets received from an IP network. SS7/IP converter 620 may be implemented using any suitable signaling adaptation and transport layer for transmitting SS7 over IP. Examples of suitable transport layers include TCP and SCTP. Examples of suitable adaptation layers include M2PA, M3UA, TALI, and SUA as described in the correspondingly named IETF Internet Drafts and RFCs.

DSM 604 includes functionality for providing database related services. In the illustrated example, DSM 604 includes a signaling connection routing controller (SCRC) 622 for determining the type of service required for a received message. One such service may include G-FLEX™ service, which translates the IMSI in a message into a point code and subsystem number of a destination, such as an HLR. G-FLEX™ subsystem 624 includes a G-FLEX™ database 112 that maps IMSIs to HLR addresses. In addition, G-FLEX™ subsystem 624 includes prepaid subscriber message processor 111 for sending the notification message to provisioning system 108 via an IP interface 626. For messages that do not require G-FLEX™ service or for which IMSIs are not specifically provisioned, DSM 604 includes a GTT database 628. Prepaid subscriber message processor 111 may perform the steps illustrated in FIG. 3A and 5B or FIG. 5 for processing location management messages relating prepaid subscribers.

Continuing with the example above, a location management message may be received by SCRC 622. SCRC 622 may determine that the message requires processing by prepaid subscriber message processor 111 of G-FLEX™ subsystem 124. Prepaid subscriber message processor 111 may process the location management message using the steps described above in FIGS. 3A and 3B or FIG. 5, depending on whether prepaid subscriber message processor 111 is stateful or stateless. Once provisioning information is obtained and stored in G-FLEX™ database 112, prepaid subscriber message processor 111 may translate the message using information in G-FLEX™ database 112. Routing function 618 may then route the message to LIM 600 or DCM 602 for transmission to the appropriate HLR.

Thus, as described above, the present invention includes methods, systems, and computer program products for processing messages associated with prepaid mobile subscribers. Because prepaid subscriber information can automatically be provisioned in an address translation database and in the associated HLR, there is no need to provision unactivated IMSIs in advance. Accordingly, HLR resources are conserved.

Although the examples described above relate primarily to provisioning HLRs, the present invention is not limited to automatically provisioning HLRs. The methods and systems described herein may be used to automatically provision any network resources, such as IN platforms, that are associated with the account SIM.

In addition, the examples described above relate to automatically provisioning steps being performed at a network routing node. However, the present invention is not limited to performing these steps at a network routing node. In an alternate implementation, the steps for automatically provisioning prepaid subscriber information may be implemented at an HLR. In such an implementation, the HLR may receive the location management message and determine whether subscription information has been provisioned for the prepaid subscriber. If subscription information has not been provisioned, the HLR may send a notification message to the provisioning system. The provisioning system may then provision both the HLR and the network routing node, as described above. Prior to provisioning, the network routing node may route the location management message to the HLR by default.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for automatically provisioning prepaid subscriber information in a telecommunications network, the method comprising:
   (a) receiving a location management message associated with a prepaid mobile subscriber;
   (b) determining whether subscription information has been provisioned for the prepaid mobile subscriber; and
   (c) in response to determining that subscription information has not been provisioned for the prepaid mobile subscriber:
      (i) sending a notification message to a provisioning system;
      (ii) at the provisioning system, receiving the notification message and sending subscription information for the prepaid mobile subscriber to a network node; and
      (iii) automatically provisioning a routing address translation database with routing address translation data for translating an identifier associated with the prepaid mobile subscriber to an address of the network node.

2. The method of claim 1 wherein the location management message comprises an update location message.

3. The method of claim 1 wherein the location management message comprises a registration notification message.

4. The method of claim 1 wherein the network node comprises an HLR and wherein determining whether subscription information has been provisioned for the prepaid mobile subscriber includes determining whether subscription information has been provisioned in the HLR.

5. The method of claim 4 wherein determining whether subscription information has been provisioned in the HLR includes accessing the routing address translation database identifying the presence of subscription information in the HLR based on the presence of the routing address translation information in the routing address translation database.

6. The method of claim 1 comprising, in response to determining that subscription information has been provisioned for the prepaid mobile subscriber, routing the location management message to the network node.

7. The method of claim 1 wherein automatically provisioning the routing address translation data comprises, at the provisioning system, in response to the notification message, sending the routing address translation data to a network routing node and storing the data in a routing address translation database maintained by the network routing node.

8. A method for automatically provisioning prepaid subscriber information in a telecommunications network, the method comprising:
   (a) receiving a location management message associated with a prepaid mobile subscriber;
   (b) determining whether subscription information has been provisioned for the prepaid mobile subscriber;
   (c) in response to determining that subscription information has not been provisioned for the prepaid mobile subscriber, sending a notification message to a provisioning system;
   (d) at the provisioning system, receiving the notification message and sending subscription information for the prepaid mobile subscriber to a destination network node for processing the location management message;
   (e) at the provisioning system, in response to the notification message, sending routing address translation data corresponding to the prepaid mobile subscriber to a network routing node, and
   (f) storing state information for the location management message in the network routing node and sending the location management message to the destination network node in response to receiving the routing address translation data.

9. A method for automatically provisioning prepaid subscriber information in a telecommunications network, the method comprising:
   (a) receiving a first location management message associated with a prepaid mobile subscriber;
   (b) determining whether subscription information has been provisioned for the prepaid mobile subscriber;
   (c) in response to determining that subscription information has not been provisioned for the prepaid mobile subscriber, sending a notification message to a provisioning system; and
   (d) at the provisioning system, receiving the notification message and sending subscription information for the prepaid mobile subscriber to a network node;
   (e) at the provisioning system, in response to the notification message, sending routing address translation data corresponding to the prepaid mobile subscriber to a network routing node; and
   (f) at the network routing node, discarding the first location management message, receiving a second location management message for the prepaid mobile subscriber, the second location management message being a retransmission of the first location management message by an MSC/VLR in response to expiration of a timeout period for the first location management message, and routing the second location management message to the network node using the routing address translation information received from the provisioning system.

10. The method of claim 1 comprising screening location management messages that relate to subscribers that are not inside of a service provider's network.

11. A system for automatically provisioning subscription data for a prepaid mobile subscriber, the system comprising:
   (a) a communications module for receiving a location management message regarding a prepaid mobile subscriber for whom subscription information has not been provisioned in a network node;
(b) a routing address translation database for storing routing address translation information for translating an identifier associated with the prepaid mobile subscriber to an address of the network node; and
(c) a database services module operatively associated with the communications module for:
  (i) receiving the location management message;
  (ii) sending a notification message to a provisioning system requesting provisioning of the network node with subscription information regarding the prepaid mobile subscriber; and
  (iii) automatically provisioning the routing address translation database with the routing address translation information for translating the identifier associated with the prepaid mobile subscriber to the address of the network node.

12. The system of claim 11 wherein the database services module is adapted to determine whether the routing address translation information has been provisioned for the prepaid subscriber in the routing address translation database and to send the notification message in response to determining that the routing address translation information has not been provisioned.

13. The system of claim 12 wherein the database services module is adapted to receive routing address translation information from the network node in response to the notification message and to store the routing address translation information in the routing address translation database.

14. A system for automatically provisioning subscription data for a prepaid mobile subscriber, the system comprising:
(a) communications module for receiving a first location management message regarding a prepaid mobile subscriber for whom subscription information has not been provisioned in a network node; and
(b) a database services module operatively associated with the communications module for receiving the first location management message and for sending a notification message to a provisioning system requesting provisioning of the network node with subscription information regarding the prepaid mobile subscriber, wherein the database services module is adapted to discard the first location management message, and, in response to receiving a second location management message, the second location management message being a retransmission of the first location management message by an MSC/VLR in response to expiration of a timeout period for the first location management message, to route the second location management message to the network node using the routing address translation data information provisioned in the routing address translation database for the subscriber.

15. A system for automatically provisioning subscription data for a prepaid mobile subscriber, the system comprising:
(a) a communications module for receiving a location management message regarding a prepaid mobile subscriber for whom subscription information has not been provisioned in a destination network node for processing the location management message; and
(b) a database services module operatively associated with the communications module for receiving the location management message and for sending a notification message to a provisioning system requesting provisioning of the network node with subscription information regarding the prepaid mobile subscriber, wherein the database services module is adapted to store state information regarding the location management message, and to route the location management message to the destination network node in response to receiving the routing address translation data from the provisioning system.

16. The system of claim 11 wherein the database services module is adapted to screen location management messages that are not associated with a service provide's network.

17. The system of claim 16 wherein the database services module is adapted to route the location management messages that are not associated with the service provider's network to their intended destinations.

18. The system of claim 11 wherein the network node comprises a home location register (HLR).

19. A computer program product comprising computer-executable instructions embodied in a computer readable medium for performing steps comprising:
(a) receiving a location management message associated with a prepaid mobile subscriber;
(b) determining whether subscription information has been provisioned for the prepaid mobile subscriber; and
(c) in response to determining that subscription information has not been provisioned for the prepaid mobile subscriber:
  (i) sending a notification message to a provisioning system;
  (ii) at the provisioning system, receiving the notification message and sending subscription information for the prepaid mobile subscriber to a network node; and
  (iii) automatically provisioning a routing address translation database with routing address translation data for translating an identifier associated with the prepaid mobile subscriber to an address of the network node.

20. The computer program product of claim 19 wherein the location management message comprises an update location message.

21. The computer program product of claim 19 wherein the location management message comprises a registration notification message.

22. The computer program product of claim 19 comprising, determining whether the routing address translation information has been provisioned for the prepaid mobile subscriber, and wherein sending the notification message includes sending the notification message in response to determining that the routing address translation information has not been provisioned for the mobile subscriber.

23. The computer program product of claim 19 comprising, discarding the location management message, receiving a retransmitted location management message regarding the prepaid mobile subscriber, and forwarding the retransmitted location management message to the network node.

24. The computer program product of claim 19 comprising storing state information for the location management message and sending the location management message to the network node in response to receiving the routing address translation data for the location management message.

25. The computer program product of claim 19 comprising screening location management messages that relate to subscribers that are not inside of a service provider's network.

26. The computer program product of claim 19 wherein the network node comprises a home location register (HLR).

* * * * *